(12) United States Patent
Ouyang et al.

(10) Patent No.: US 10,473,819 B2
(45) Date of Patent: Nov. 12, 2019

(54) 2D SQUARE LATTICE PHOTONIC CRYSTAL BASED ON HOLLOW CYLINDER AND CONNECTING PLATES

(71) Applicant: Zhengbiao Ouyang, Shenzhen (CN)

(72) Inventors: Zhengbiao Ouyang, Shenzhen (CN); Jingjing Wang, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 298 days.

(21) Appl. No.: 15/253,765

(22) Filed: Aug. 31, 2016

(65) Prior Publication Data

US 2016/0370501 A1    Dec. 22, 2016

Related U.S. Application Data

(63) Continuation of application No. PCT/CN2015/076043, filed on Apr. 8, 2015.

(30) Foreign Application Priority Data

Apr. 11, 2014 (CN) .......................... 2014 1 0145359

(51) Int. Cl.
 *G02B 1/00* (2006.01)
(52) U.S. Cl.
 CPC .................................... *G02B 1/005* (2013.01)
(58) Field of Classification Search
 CPC ...... B82Y 20/00; G02B 6/1225; G02B 1/005; G02B 6/02328; G02B 1/02; G02B 1/00; G02B 6/122; G02F 2202/32; G02F 1/03; G02F 1/07; H01S 5/105; Y10T 428/2935; Y10T 428/2975

See application file for complete search history.

(56) References Cited

U.S. PATENT DOCUMENTS

| | | | | |
|---|---|---|---|---|
| 6,542,682 B2 * | 4/2003 | Cotteverte | ............. | B82Y 20/00 385/125 |
| 7,161,188 B2 * | 1/2007 | Orita | ...................... | B82Y 20/00 257/98 |
| 2002/0074307 A1 * | 6/2002 | Cotteverte | ............. | B82Y 20/00 216/2 |
| 2003/0185532 A1 * | 10/2003 | Hosomi | ................. | B82Y 20/00 385/129 |
| 2006/0104586 A1 * | 5/2006 | Tokushima | ............ | B82Y 20/00 385/129 |

(Continued)

*Primary Examiner* — William R Alexander
*Assistant Examiner* — Balram T Parbadia
(74) *Attorney, Agent, or Firm* — Wen IP LLC

(57) ABSTRACT

A two-dimensional (2D) square-lattice photonic crystal (PhC) based on a circular hollow dielectric cylinder and flat dielectric cylinders include a high-refractive-index dielectric cylinder and a low-refractive-index dielectric background, the PhC structure is formed by arranging unit cells in a square-lattice; one lattice constant of the square-lattice PhC is a; each unit cell includes a circular hollow dielectric cylinder and flat dielectric cylinders; and the circular hollow dielectric cylinder is connected to four flat dielectric cylinders; a width D of the flat dielectric cylinder is 0.01a to 0.2a, an outer diameter R of the circular hollow dielectric cylinder is 0.1a to 0.5a, and a ratio T of a difference between an inner diameter and an outer diameter of the circular hollow dielectric cylinder to the outer diameter of the circular hollow dielectric cylinder is 0.01 to 0.99.

12 Claims, 4 Drawing Sheets

(56) References Cited

U.S. PATENT DOCUMENTS

| | | | | |
|---|---|---|---|---|
| 2007/0196066 A1* | 8/2007 | Wang | .............. | B82Y 20/00 385/129 |
| 2007/0253660 A1* | 11/2007 | Wang | .............. | B82Y 20/00 385/5 |
| 2007/0297734 A1* | 12/2007 | Ibanescu | .............. | G02F 1/3534 385/125 |
| 2008/0117941 A1* | 5/2008 | Nagatomo | .............. | B82Y 20/00 372/19 |
| 2008/0131660 A1* | 6/2008 | Noda | .............. | B82Y 20/00 428/138 |
| 2008/0205842 A1* | 8/2008 | Suzuki | .............. | B82Y 20/00 385/131 |
| 2008/0267557 A1* | 10/2008 | Wang | .............. | B82Y 20/00 385/16 |
| 2009/0148114 A1* | 6/2009 | Numata | .............. | B82Y 20/00 385/131 |
| 2009/0263094 A1* | 10/2009 | Noda | .............. | B82Y 20/00 385/129 |
| 2009/0269005 A1* | 10/2009 | Sigalas | .............. | B82Y 20/00 385/16 |
| 2010/0104250 A1* | 4/2010 | Noda | .............. | B82Y 20/00 385/129 |
| 2010/0221537 A1* | 9/2010 | Farjadpour | .............. | G02B 6/02328 428/376 |
| 2011/0216796 A1* | 9/2011 | Nagatomo | .............. | B82Y 20/00 372/45.01 |
| 2012/0243844 A1* | 9/2012 | Ouyang | .............. | B82Y 20/00 385/130 |
| 2012/0251048 A1* | 10/2012 | Ouyang | .............. | B82Y 20/00 385/50 |
| 2013/0028553 A1* | 1/2013 | Jia | .............. | G02B 6/1225 385/11 |

\* cited by examiner

2D SQUARE LATTICE PHOTONIC CRYSTAL BASED ON HOLLOW CYLINDER AND CONNECTING PLATES

CROSS-REFERENCE TO RELATED APPLICATIONS

This application is a continuation of International Patent Application No. PCT/CN2015/076043 with a filing date of Apr. 8, 2015, designating the United States, now pending, and further claims priority to Chinese Patent Application No. 201410145359.8 with a filing date of Apr. 11, 2014. The content of the aforementioned applications, including any intervening amendments thereto, are incorporated herein by reference.

TECHNICAL FIELD

The present invention relates to a 2D photonic crystal with a wide absolute bandgap.

BACKGROUND OF THE PRESENT INVENTION

In 1987, E. Yablonovitch of Bell laboratory of the United States and S. John of Princeton University independently put forward the concept of photonic crystal respectively in discussion about how to suppress spontaneous radiation and in discussion about a photonic localization. The photonic crystal is a substance structure formed by periodically arranging dielectric materials in a space, and is usually an artificial crystal composed of two or more materials with different dielectric constants.

In a frequency domain, with regard to a TE wave or a TM wave propagating in any direction, a frequency interval with an electromagnetic field state density of zero is defined as a TE complete bandgap or a TM complete bandgap of a photonic crystal, and a frequency interval which is the TE complete bandgap and the TM complete bandgap simultaneously is called as an absolute bandgap of the photonic crystal. A photonic crystal with a complete bandgap or an absolute bandgap is designed, and is capable of simply and effectively regulating and controlling the macroscopic electromagnetic properties of a dielectric, including selecting a frequency band for propagating an electromagnetic wave, a mode and a transmission path and controlling the absorption or radiation and other properties of the dielectric as a basis of controlling the movement of photons and of producing various photonic devices.

With regard to each of the various photonic crystal devices, the wider a photonic bandgap is, the better the performance of the device is. For example, the wider a photonic bandgap is, the wider a working frequency band of a photonic crystal waveguide is, the lower the transmission loss is, the higher the quality factors of a photonic crystal resonant cavity and a laser device are, the better the constraint effect of a photonic crystal on spontaneous radiation is, the higher the reflectivity of a photonic crystal reflector is, and the like. The photonic crystal with a complete bandgap and an absolute bandgap has a photonic bandgap with regard to lights in different propagation directions.

In the prior art, a relatively large bandgap is obtained by virtue of triangular lattices, hexagonal lattices and other non-square lattice structures; however, in an integrated optical circuit of a photonic crystal, it is not easy to provide optical circuit integration; and in the prior art, a square lattice photonic crystal has a quite small absolute bandgap width.

SUMMARY OF PRESENT INVENTION

The objective of the present invention is to overcome shortages in the prior art, and provide a 2D square lattice photonic crystal which facilitates optical circuit integration and has a relative value of a quite large absolute bandgap width.

The objective of the present invention is realized through the following technical solution.

A 2D square lattice photonic crystal based on a circular ring rod, i.e., hollow cylinder, and flat connecting rods, i.e., connecting plates, of the present invention comprises a high-refractive-index dielectric pillar and a low-refractive-index background dielectric pillar; wherein the photonic crystal structure is formed by arranging unit cells into a square lattice; the high-refractive-index dielectric pillar is formed by connecting a plate dielectric pillar and a circular ring dielectric pillar; a width of the plate dielectric pillar, D, is 0.01a to 0.2a, an outer diameter of the circular ring pillar, R, is 0.1a to 0.5a, and a ratio between the difference between an inner diameter and the outer diameter of the circular ring pillar and the outer diameter of the circular ring pillar, T, is 0.01 to 0.99.

The distance from the left-most end of a left flat connecting rod of the unit cell to the right-most end of a right flat connecting rod of the unit cell is a; and the distance from the bottom end of a lower flat connecting rod of the unit cell to the top end of an upper flat connecting rod of the unit cell is a.

The high-refractive-index dielectric is silicon, gallium arsenide, titanium dioxide or a high-refractive-index dielectric with a refractive index of greater than 2.

The high-refractive-index dielectric is silicon, with a refractive index of 3.4.

The low-refractive-index background dielectric is air, magnesium fluoride, silicon dioxide or a low-refractive-index dielectric.

The low-refractive-index background dielectric is air.

It is set that $0.029a \leq D \leq 0.124a$, $0.26a \leq R \leq 0.38a$, and $0.206 \leq T \leq 0.99$ and a relative value of an absolute bandgap of the photonic crystal structure is greater than 5%.

It is set that $0.029a \leq D \leq 0.086a$, $0.26a \leq R \leq 0.38a$, and $0.304 \leq T \leq 0.99$; and a relative value of an absolute bandgap of the photonic crystal structure is greater than 10%.

It is set that $0.029a \leq D \leq 0.05275a$, $0.28a \leq R \leq 0.34a$, and $0.304 \leq T \leq 0.99$; and a relative value of an absolute bandgap of the photonic crystal structure is greater than 15%.

D is set to 0.049a, R is set to 0.296a, T is set 0.838, and a relative value of an absolute bandgap width is 19.028%.

The 2D square lattice photonic crystal based on the circular ring rod and the flat connecting rods of the present invention can be widely applied to large-scale integrated optical circuit design. Compared with the prior art, the photonic crystal has the following positive effects.

(1) Lots of fine researches are carried out by a plane wave expansion method to obtain a relative value of the maximum absolute bandgap and the corresponding parameters; and the ratio between an absolute bandgap width and a bandgap center frequency is usually taken as an inspection index of a bandgap width, and is called as a relative value of the absolute bandgap width.

(2) The photonic crystal structure has a quite large absolute bandgap, and can provide greater convenience and flexibility to the design and manufacture of photonic crystal devices.

(3) In an integrated optical circuit of a photonic crystal, it is easy to connect and couple between different optical components in one optical circuit and between different optical circuits and with the adoption of a square lattice structure, optical circuits can be simple and clear, and it facilitates optical circuit integration.

(4) The photonic crystal is simple design and easy to manufacture, and the production cost is reduced.

DETAILED DESCRIPTION OF PREFERRED EMBODIMENTS

The embodiments of the present invention will be described below in detail with reference to the accompanying drawings.

Figure 1:
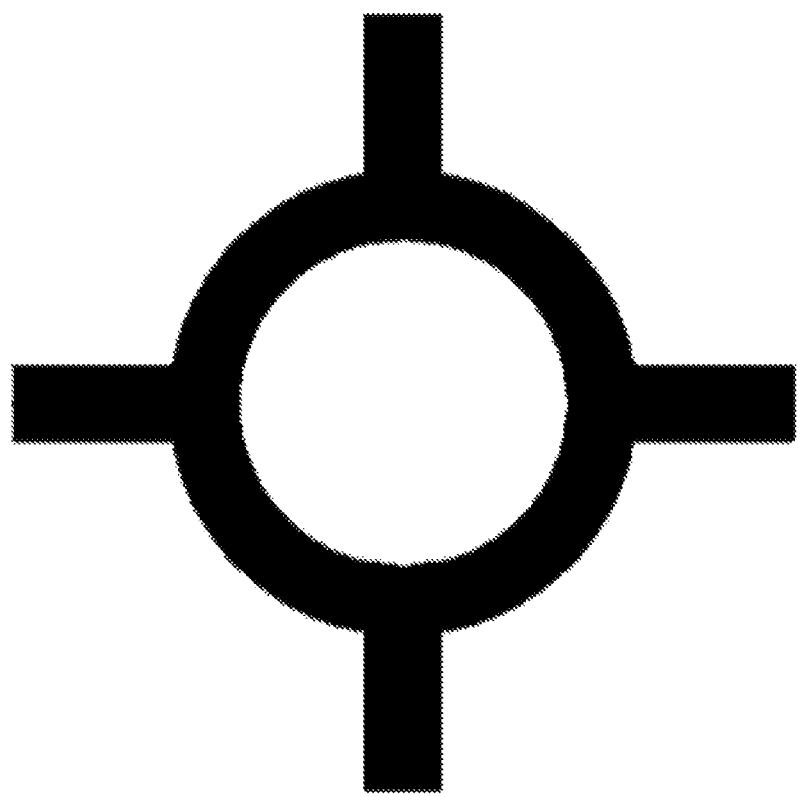
FIG. 1 is a structural schematic diagram of a 2D square lattice photonic crystal based on a circular ring rod and flat connecting rods of the present invention.

A 2D square lattice photonic crystal based on a circular ring rod and flat connecting rods of the present invention comprises a high-refractive-index dielectric pillar and a low-refractive-index background dielectric pillar. FIG. 1 shows a unit cell of the photonic crystal, and the photonic crystal structure is formed by arranging unit cells into a square lattice. There are three characteristic parameters for the unit cell structure: the width of the plate dielectric pillar, D, the outer diameter of the circular ring pillar, R, and the ratio between the difference between the inner diameter and outer diameter of the circular ring pillar and the outer diameter of the circular ring pillar, T. The lattice constant of the square lattice photonic crystal is a; the distance from the left-most end of the left flat connecting rod of the unit cell to the right-most end, of the right flat connecting rod of the unit cell is a; the distance from the bottom end of the lower flat connecting rod of the unit cell to the top end of the upper flat connecting rod of the unit cell is a; the high-refractive-index dielectric cylinder is formed by connecting a plate dielectric pillar and a circular ring dielectric pillar; silicon (Si) is adopted as the high-refractive-index dielectric, and the low-refractive-index background dielectric is air.

A relative value of the maximum absolute bandgap can be obtained by carrying out optimization search research on the photonic crystal structure through a steepest descent method.

(1) The initial scanning ranges of the three parameters are determined as follows: the width of the plate dielectric pillar, D, is from 0.01a to 0.2a, the outer diameter of the circular ring pillar, R, is from 0.1 a to 0.5a, and the ratio between the difference between the inner diameter and outer diameter of the circular ring pillar and the outer diameter of the circular ring pillar, T, is from 0.01 to 0.99.

(2) Initial scanning is carried out on the basis of a plane wave expansion method, so as to obtain the following better parameters: the width of the plate dielectric pillar, D, is 0.048a, and the outer diameter of the circular ring pillar, R, is 0.3a.

Figure 2:
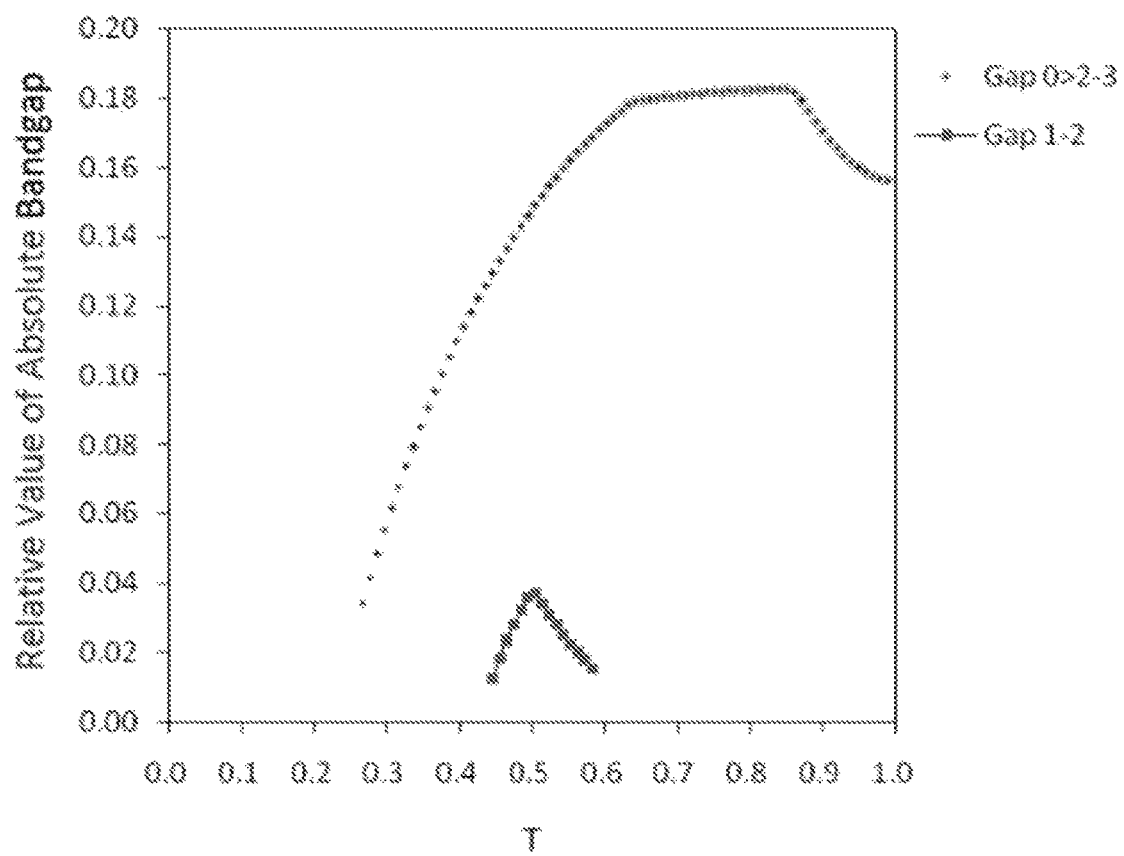
FIG. 2 is a diagram of influence from the ratio T of the difference between the inner diameter and outer diameter of the circular ring pillar to the outer diameter of the circular ring pillar on a relative value of an absolute bandgap of the present invention.

(D is set to a fixed value of 0.048a R is set to a fixed value of 0.3a, and T is scanned on the basis of the plane wave expansion method, so as to obtain results shown in FIG. 2. The value of Tin FIG. 2 has a complete bandgap in a range from 0.267 to 0.99, a relative value of the maximum absolute bandgap is achieved when T is equal to 0.8415, and gapratio1=18.276%.

(4) D is set to a fixed value of 0.048a, T is set to a fixed value of 0.8415, and R is scanned on the basis of the plane wave expansion method, so as to obtain a relative value of the optimal absolute bandgap, gapratio2=18.649% and the corresponding R value is 0.296a.

(5) R is set to a fixed value of 0.296a. T is set to a fixed value of 0.8415, and D is scanned on the basis of the plane wave expansion method, so as to obtain a relative value of the optimal absolute bandgap, gapratio2=18.998%, and the corresponding D value is 0.048776a.

(6) Whether |(gapratio2−gapratio1)/(gapratio2+gapratio1)| is less than 1% or not is judged; and if not, a new round of scanning is carried out on each parameter according to the results in the abovementioned steps, the search is concluded until |(gapratio2−gapratio1)/(gapratio2+gapratio1)| is less than 1%, and a relative value of the most optimal absolute bandgap and the corresponding structural parameters are finally obtained.

Figure 3:
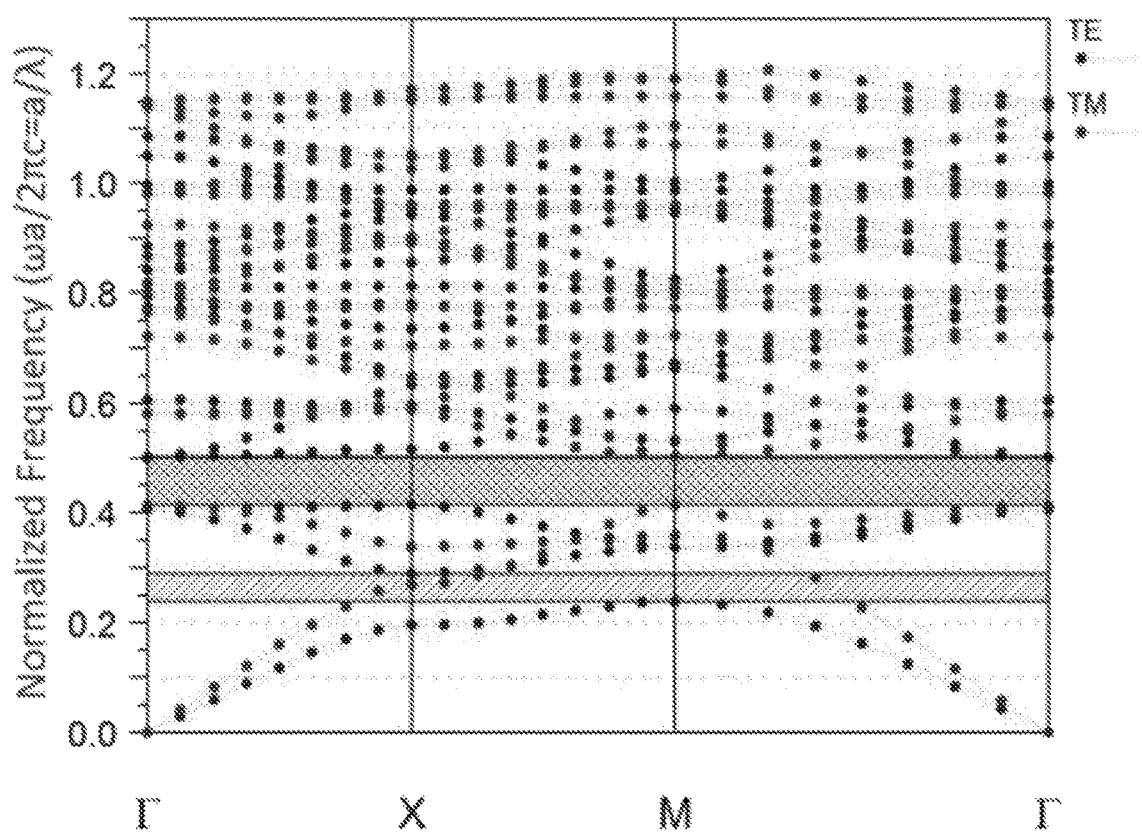
FIG. 3 is an energy band diagram of the photonic crystal structure corresponding to a relative value of the maximum absolute bandgap width of the present invention.
Figure 4:
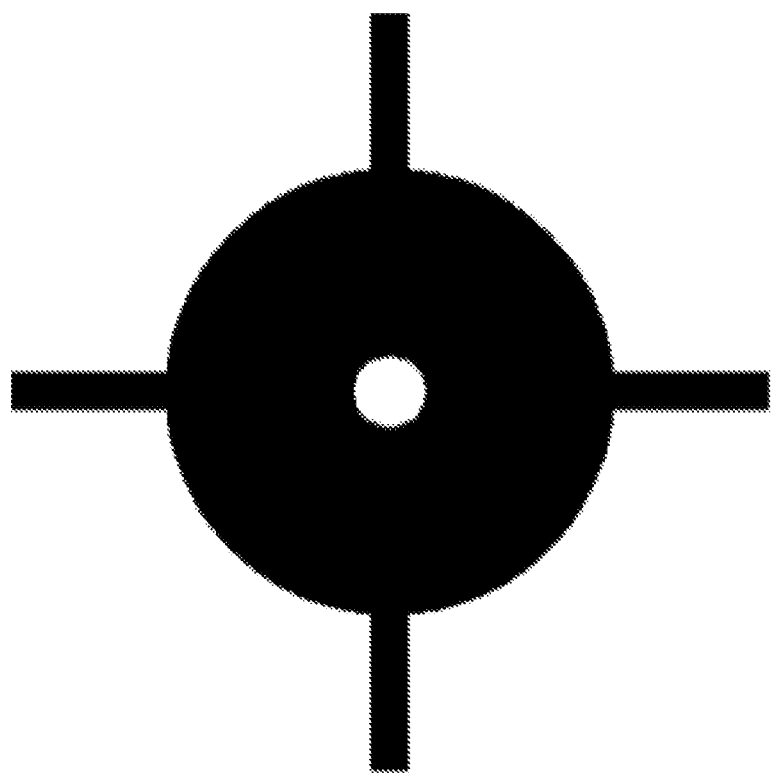
FIG. 4 is a structural diagram of a parameter corresponding to a relative value of the maximum absolute bandgap of the photonic crystal of the present invention.

The optimization results finally obtained are as follows: when D=0.049a, R=0.296a and T=0.838, the relative value of the maximum absolute bandgap=19.026%. The energy band diagram is shown in FIG. 3, and the photonic crystal structure under the final structure parameters is shown in FIG. 4.

Nine embodiments below are given according to the abovementioned results.

Embodiment 1. Silicon is adopted as the high-refractive-index dielectric, the low-refractive-index dielectric is air, a=0.6975, the width of the plate dielectric pillar, D=0.049a=0.034 micron, the outer diameter of the circular ring pillar, R=0.296a=0.206 micron. and the inner diameter of the circular ring pillar is 0.033 micron; thus an absolute bandgap range of a photonic crystal is from 1.69025 to 1.39659, and a relative value of the absolute bandgap is correspondingly 19.026%.

Embodiment 2. Silicon is adopted as the high-refractive-index dielectric, the low-refractive-index dielectric is air, a=0.765, the width of the plate dielectric pillar, D=0.049a=0.037 micron, the outer diameter of the circular ring pillar, R=0.296a=0.226 micron, and the inner diameter of the circular ring pillar is 0.037 micron; thus an absolute bandgap range of a photonic crystal is from 1.85383 to 1.53175, and a relative value of an absolute bandgap is correspondingly 19.026%.

Embodiment 3. Silicon is adopted as the high-refractive-index dielectric, the low-refractive-index dielectric is air, a=0.585, the width of the plate dielectric pillar, D=0.049a=0.029 micron, the outer diameter of the circular ring pillar, R=0.296a=0.173 micron, and the inner diameter of the circular ring pillar is 0.028 micron; thus an absolute bandgap range of a photonic crystal is from 1.41763 to 1.17134, and a relative value of an absolute bandgap is correspondingly 19.026%.

Embodiment 4. Silicon is adopted as the high-refractive-index dielectric, the low-refractive-index dielectric is air, a=0.585, the width of the plate dielectric pillar, D=0.067a=0.039 micron, the outer diameter of the circular ring pillar, R=0.34a=0.199 micron, and the inner diameter of the circular ring pillar is 0.119 micron; thus an absolute bandgap range of a photonic crystal is from 1.37218 to 1.30510, and a relative value of an absolute bandgap is correspondingly 5.011%.

Embodiment 5. Silicon is adopted as the high-refractive-index dielectric, the low-refractive-index dielectric is air, a=0.585, the width of the plate dielectric pillar, D=0.067a=0.039 micron, the outer diameter of the circular ring pillar, R=0.26a=0.152 micron, and the inner diameter of the circular ring pillar is 0.061 micron; thus an absolute bandgap range of a photonic crystal is from 1.26582 to 1.16764, and a relative value of an absolute bandgap is correspondingly 8.066%.

Embodiment 6. Silicon is adopted as the high-refractive-index dielectric, the low-refractive-index dielectric is air, a=0.455, the width of the plate dielectric pillar, D=0.048a=0.022 micron, the outer diameter of the circular ring pillar, R=0.38a=0.173 micron, and the inner diameter of the circular ring pillar is 0.053 micron; thus an absolute bandgap range of a photonic crystal is from 1.23246 to 1.11487, and a relative value of an absolute bandgap is correspondingly 10.016%.

Embodiment 7. Silicon is adopted as the high-refractive-index dielectric, the low-refractive-index dielectric is air, a=0.45, the width of the plate dielectric pillar, D=0.029a=0.013 micron, the outer diameter of the circular ring pillar, R=0.3a=0.135 micron, and the inner diameter of the circular ring pillar is 0.054 micron; thus an absolute bandgap range of a photonic crystal is from 0.97308 to 0.85701, and a relative value of an absolute bandgap is correspondingly 12.087%.

Embodiment 8. Silicon is adopted as the high-refractive-index dielectric, the low-refractive-index dielectric is air, a=0.425, the width of the plate dielectric pillar, D=8.048a=0.020 micron, the outer diameter of the circular ring pillar, R=0.26a=0.111 micron, and the inner diameter of the hollow cylinder is 0.034 micron; thus an absolute bandgap range of a photonic crystal is from 0.93079 to 0.79715, and a relative value of an absolute bandgap is correspondingly 15.468%.

Embodiment 9. Silicon is adopted as the high-refractive-index dielectric, the low-refractive-index dielectric is air, a=0.385, the width of the plate dielectric pillar, D=0.048a=0.018 micron, the outer diameter of the circular ring pillar, R=0.3a=0.116 micron, and the inner diameter of the circular ring pillar is 0.035 micron; thus an absolute bandgap range of a photonic crystal is from 0.92702 to 0.77334, and a relative value of an absolute bandgap is correspondingly 18.079%.

The specific embodiments and application scopes of the present invention above are improved which should not be interpreted as a limitation to the present invention.

We claim:

1. A two-dimensional (2D) square-lattice photonic crystal (PhC) based on a circular hollow dielectric cylinder and flat dielectric cylinders, comprising:

A high-refractive-index dielectric cylinder and a low-refractive-index dielectric background, the PhC structure is formed by arranging unit cells in a square-lattice; one lattice constant of the square-lattice PhC is a; each unit cell comprises a circular hollow dielectric cylinder and flat dielectric cylinders; and the circular hollow dielectric cylinder is connected to four flat dielectric cylinders; a width D of the flat dielectric cylinder is 0.01a to 0.2a, an outer diameter R of the circular hollow dielectric cylinder is 0.1a to 0.5a, and a ratio T of a difference between an inner diameter and an outer diameter of the circular hollow dielectric cylinder to the outer diameter of the circular hollow dielectric cylinder is 0.01 to 0.99.

2. The 2D square-lattice PhC based on a circular hollow dielectric cylinder and flat dielectric cylinders of claim 1, wherein the flat dielectric cylinders include a left flat dielectric cylinder, a right flat dielectric cylinder, an upper flat dielectric cylinder, and a lower flat dielectric cylinder.

3. The 2D square-lattice PhC based on a circular hollow dielectric cylinder and flat dielectric cylinders of claim 2, wherein one lattice constant of the square-lattice PhC is a; a distance from left-most end of the left flat dielectric cylinder to right-most end of the right flat dielectric cylinder is a; and a distance from bottom end of the lower flat dielectric cylinder to top end of the upper flat dielectric cylinder is a.

4. The 2D square-lattice PhC based on a circular hollow dielectric cylinder and flat dielectric cylinders of claim 1, wherein the high-refractive-index dielectric has a refractive index greater than 2.

5. The 2D square-lattice PhC based on a circular hollow dielectric cylinder and flat dielectric cylinders of claim 1, wherein the high-refractive-index dielectric is silicon, gallium arsenide, or titanium dioxide.

6. The 2D square-lattice PhC based on a circular hollow dielectric cylinder and flat dielectric cylinders of claim 5, wherein the high-refractive dielectric is silicon, with a refractive index of 3.4.

7. The 2D square-lattice PhC based on a circular hollow dielectric cylinder and flat dielectric cylinders of claim 1, wherein the low-refractive-index dielectric background is air, magnesium fluoride, or silicon dioxide.

8. The 2D square-lattice PhC based on a circular hollow dielectric cylinder and flat dielectric cylinders of claim 7, wherein the low-refractive-index dielectric background is air.

9. The 2D square-lattice PhC based on a circular hollow dielectric cylinder and flat dielectric cylinders of claim 1, wherein one lattice constant of the square-lattice PhC is a; a width D of the flat dielectric cylinder is greater than or equal to 0.124a, and less than or equal to 0.029a; an outer diameter R of the circular hollow dielectric cylinder is greater than or equal to 0.38a, and less than or equal to 0.26a; and a ratio T of a difference between an inner diameter and the outer diameter of the circular hollow dielectric cylinder to the outer diameter of the circular hollow dielectric cylinder is greater than or equal to 0.99, less than or equal to 0.206; and a relative value of an absolute band gap of the PhC structure is greater than 5%.

10. The 2D square-lattice PhC based on a circular hollow dielectric cylinder and flat dielectric cylinders of claim 1, wherein one lattice constant of the square-lattice PhC is a; a width D of the flat dielectric cylinder is greater than or equal to 0.086a, and less than or equal to 0.029a; an outer diameter R of the circular hollow dielectric cylinder is greater than or equal to 0.38a, and less than or equal to 0.26a; and a ratio T of a difference between an inner diameter and the outer diameter of the circular hollow dielectric cylinder to the outer diameter of the circular hollow dielectric cylinder is greater than or equal to 0.99, less than or equal to 0.304; and a relative value of an absolute band gap of the PhC structure is greater than 10%.

11. The 2D square-lattice PhC based on a circular hollow dielectric cylinder and flat dielectric cylinders of claim 1, wherein one lattice constant of the square-lattice PhC is a; a width D of the flat dielectric cylinder is greater than or equal to 0.05275a, and less than or equal to 0.0385a; an outer diameter R of the circular hollow dielectric cylinder is greater than or equal to 0.34a, and less than or equal to 0.28a; and a ratio T of a difference between an inner diameter and the outer diameter of the circular hollow dielectric cylinder to the outer diameter of the circular hollow dielectric cylinder is greater than or equal to 0.99, less than or equal to 0.4755, and a relative value of an absolute band gap of the PhC structure is greater than 15%.

12. The 2D square-lattice PhC based on a circular hollow dielectric cylinder and flat dielectric cylinders of claim 1, wherein one lattice constant of the square-lattice PhC is a; a width D of the flat dielectric cylinder is 0.049a, an outer diameter R of the circular hollow dielectric cylinder is 0.296a; and a ratio T of a difference between an inner diameter and the outer diameter of the circular hollow dielectric cylinder to the outer diameter of the circular hollow dielectric cylinder is 0.838; and a relative value of an absolute band gap of the PhC structure is 19.026%.

* * * * *